(12) United States Patent
Rosental et al.

(10) Patent No.: US 7,526,098 B2
(45) Date of Patent: Apr. 28, 2009

(54) BASS REFLEX BOX ARRANGEMENT INCLUDING TOOL STORAGE

(75) Inventors: Frank Rosental, Stuttgart (DE); Andreas Heim, Esslingen (DE); Werner Stuffle, Remseck (DE)

(73) Assignee: Marlok Automotive GmbH, Esslingen (DE)

( * ) Notice: Subject to any disclaimer, the term of this patent is extended or adjusted under 35 U.S.C. 154(b) by 972 days.

(21) Appl. No.: 10/821,743

(22) Filed: Apr. 9, 2004

(65) Prior Publication Data

US 2004/0234082 A1 Nov. 25, 2004

(30) Foreign Application Priority Data

Apr. 10, 2003 (DE) ................................ 103 16 677

(51) Int. Cl.
*H04R 1/00* (2006.01)
(52) U.S. Cl. .......................... 381/389; 381/365; 381/86
(58) Field of Classification Search .................. 381/86, 381/349, 389, 365
See application file for complete search history.

(56) References Cited

U.S. PATENT DOCUMENTS 5,170,435 A * 12/1992 Rosen et al. .................. 381/86

FOREIGN PATENT DOCUMENTS

DE 31 40 321 A1 4/1983

* cited by examiner

*Primary Examiner*—Vivian Chin
*Assistant Examiner*—Con P Tran
(74) *Attorney, Agent, or Firm*—Reising Ethington P.C.

(57) ABSTRACT

The invention relates to a motor vehicle having a system for reproduction of sound, said system for reproduction of sound including as least one bass reflection box equipped with a bass reflection tube and/or a bass reflection opening and with at least one built-in speaker. For that purpose, the bass reflection box is arranged in a side compartment of the interior of the vehicle, and a wall of the bass reflection box, oriented towards the interior of the vehicle, is at least partially coverable with a sound-transmissive lid, the service tools and emergency aids being arranged between depressions in said wall and the lid.

With the present invention, a motor vehicle having a sound reproduction apparatus is created in which a large-volume bass reflection box is optimally accommodated in the trunk compartment. Here the bass reflection box is additionally utilized to accommodate the service tool kit.

11 Claims, 2 Drawing Sheets

BASS REFLEX BOX ARRANGEMENT INCLUDING TOOL STORAGE

CROSS-REFERENCE TO RELATED APPLICATION

This application is a National Stage of German Patent Application No. DE 103 16 677.7, filed on Apr. 10, 2003. The disclosure of the above application is incorporated herein by reference.

FIELD OF THE INVENTION

The present invention relates to a motor vehicle having a system for reproduction of sound, said sound reproduction system including at least one bass reflection box equipped with a bass reflection tube and/or a bass reflection opening, and with at least one built-in speaker.

BACKGROUND AND SUMMARY OF THE INVENTION

A bass reflection box, that is to say a Helmholz resonator, consists as a rule of an air-filled housing, a built-in speaker and a bass reflection tube or a bass reflection opening. The speaker represents the first oscillatory system, while the volume of air represents the second oscillatory system. Between the driving speaker and the driven volume of air, proper design results in a resonance feedback, such that the compression wave emerging from the bass reflex opening experiences a phase shift to amplify the direct compression wave. By a suitable choice of resonance frequency, an amplification of the low-pitch reproduction is achieved with simultaneous reduction of the speaker diaphragm deflection. For an optimal bass reflection box, a cavity of large volume is required in the motor vehicle, without decreasing the volume of the passenger and baggage compartments.

The present invention, then, is addressed to the problem of finding a suitable cavity in the motor vehicle in which a bass reflection box can be accommodated, while at the same time a portion of the space in the bass reflection box or a portion of the wall of the bass reflection box can serve some other use.

This problem is solved by the features of the principal claim. For this purpose, the bass reflection box is arranged in a side compartment of the interior of the vehicle, and a wall of the bass reflection box oriented towards the interior of the vehicle is at least partially covered with a sound-transmissive cover, the service tool and emergency aids being arranged between depressions in that wall and the cover.

In the case of motor vehicles, generally a service tool kit is included in the delivery. The minimum scope of this kit includes at least the tools required to repair tire damage, at least temporarily. These tools, or emergency aids, are commonly accommodated in the trunk compartment, in the spare wheel well, or in a side compartment. The same adjoining spaces are often used in motor vehicles, in particular station wagons, having a more elaborate sound reproduction system, for bass boxes. In these vehicles, it has been necessary heretofore to accommodate service tools and other emergency aids elsewhere. This has led as a rule to greater difficulty of access or unavailability in serious emergency situations. Finally, the tool was to be found in a location unfamiliar to the average operator.

By the integration of the service tool kit with or into a bass reflection box installed in a side compartment, any separate unaccustomed accommodation is unnecessary. A, generally for the most part, unused space is used to improve the system sound, and, at the same time, the service tool kit becomes readily and handily accessible.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
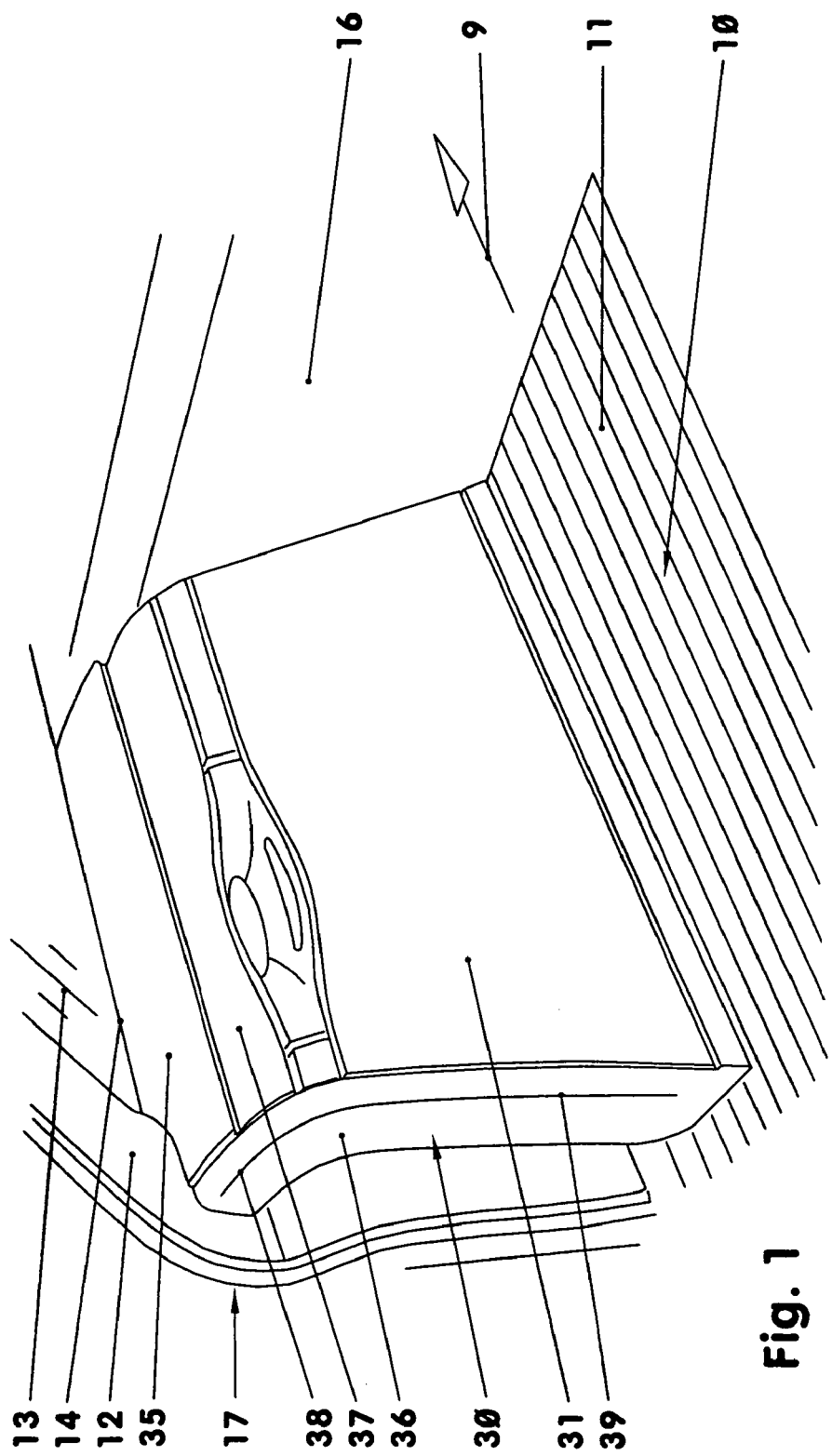
FIG. 1 is a perspective view of a bass reflection box arranged in a station wagon.
Figure 2:
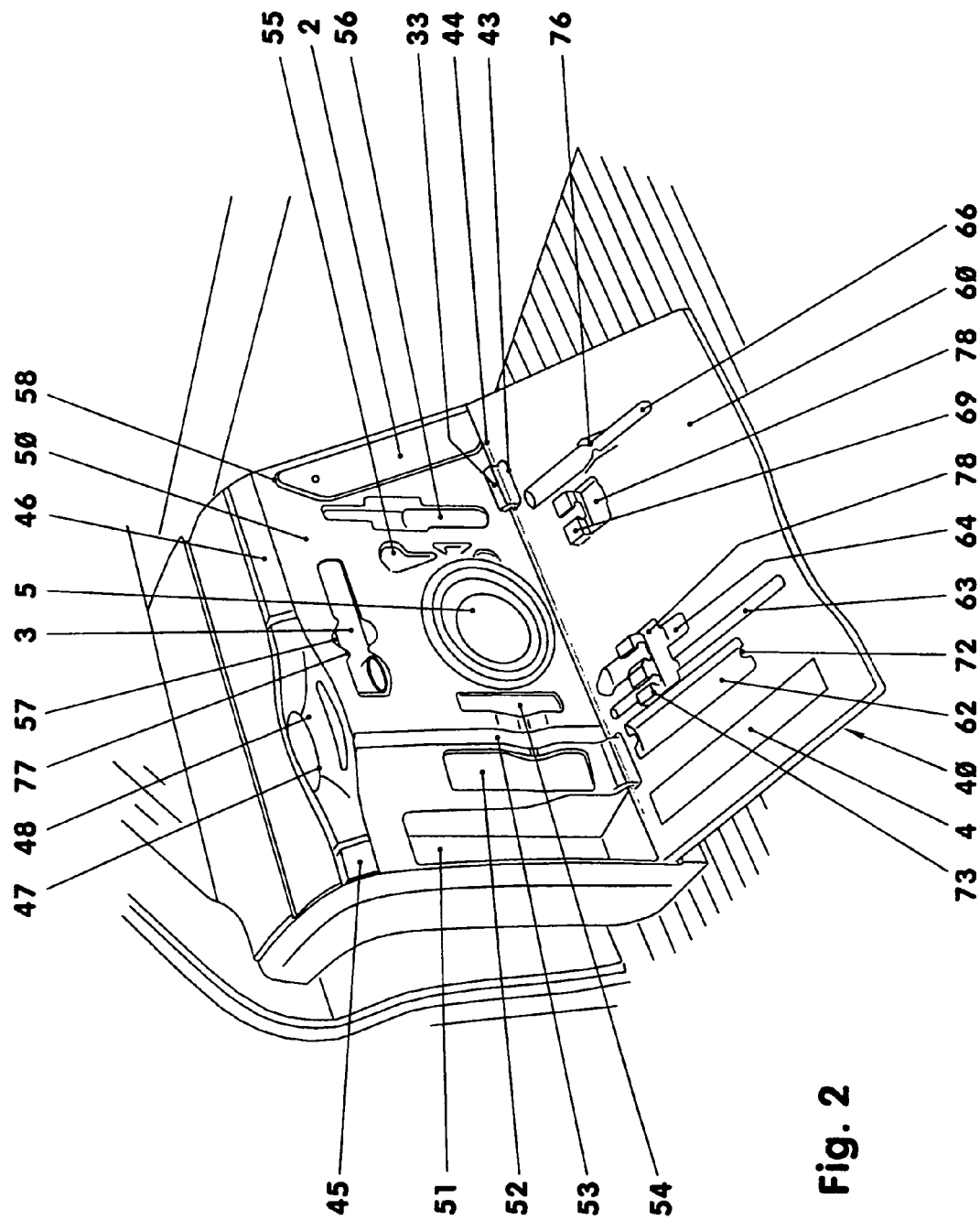
FIG. 2 is a perspective view of the bass reflection box of FIG. 1 with a cover opened.

FIGS. 1 and 2 show the tail portion of a station wagon with hatchback open. For example, on the driver's side, a bass reflection box (30) is arranged behind the backrest (16) of the second row of seats between the wheel box and the opening (17) of the hatchback.

The bass reflection box (30) fills the body compartment in lengthwise direction of the vehicle between the C- and D-columns (12) below the rear side window (13). In this embodiment, by way of example, the bass reflection box (30) terminates downward at the level of the baggage compartment floor (11). Optionally, it may also extend below the floor level. The cavity of the bass reflection box (30) can be additionally connected to the cavities underneath the baggage compartment floor (11).

The bass reflection box (30) here has essentially the shape of an obliquely truncated rectangular solid, the oblique face being the surface in contact with the backrest (16). Towards the baggage compartment (10), it has an e.g. largely plane wall (31) oriented perpendicular to the transverse direction of the vehicle. The vertical extent of the wall (31) lies between the baggage compartment floor (11) and the bottom edge (14) of the rear side window (13). As top covering, the bass reflection box (30) has a wall (35) extending along the side window sill (14) and oriented parallel in transverse direction to the baggage compartment floor (11). Towards the hatchback, the bass reflection box (30) terminates at a wall (36), matching the inclination and/or contour of the hatchback surfaces in that area. As a rule, the edges at which the walls (31, 35, 36) abut are configured as curved surfaces (37, 38, 39), whose minimum radii lie in the lower centimeter range.

In the area of the curved surface (37) between the e.g. vertical wall (31) and the upper top (35), whose minimal radius of curvature is, for example, greater than five centimeters, there is a bass reflection tube opening (47). It is e.g. the outer end of a bass reflection tube laid in the bass reflection box (30), acoustically connecting the back of the speaker to the passenger compartment (10). The bass reflection tube opening (47) is of funnel-shaped configuration, with oval cross-section (48). The horizontal cross-sectional extent of the opening (47) is e.g. about eight centimeters.

Between the funnel (48) and the edge (39), an unlocking key (45) is arranged. On the same level, there may be another key (46) between the funnel (48) and the backrest (16).

Underneath the funnel (48) and the keys (45, 46), the wall (31) has the conformation of a lid (40). The lid (40) is a hinged lid, openable about an axis of swing (44), located e.g. offset some millimeters parallelwise above the baggage compartment floor (11), cf. FIG. 2. The lid (40) in closed condition lies with its inside (60) in front of a receptacle wall (50) of the bass reflection box (30). For the configuration of two hinges, in the lower portion of the receptacle wall (50), two hooks (33) are arranged which extend downward, whence each engages an angled hinge recess (43) of the lid (40). The lid (40), locked to the receptacle wall (50), for example, in closed condition can be opened by pressing the unlocking key (45).

The geometrically rigid, unbreakable and, for example, plain lid (40), consisting at least partly of a sound-transmissive material or a suitable composite material, is e.g. approximately 10 millimeters thick. It protectively covers, among other things, a speaker (5) set into the mid-portion of the receptacle wall (50).

The lid (40) on the inside (60) has a plurality of depressions (62-66). Some of the depressions in the lid, when the lid (40) is closed, face other depressions in the receptacle wall (50). Between opposed depressions, parts of the service tool kit (3) and other emergency aids (2, 4) are arranged.

For example, directly beside the edge (39) there is a depression (51) in which a jack is inserted. In a depression (58), near the backrest (16), a warning triangle (2) is placed. In the upper part of the receptacle wall (50), there is a, for example, horizontal depression (57) in which an e.g. battery-operated pocket lamp (3) is inserted. These three depressions (51, 57, 58) in the embodiment, by way of example according to FIG. 2, are not faced by any lid depressions. The depression (57) for the pocket lamp (3) has in its middle depression area e.g. three clamps (77) effecting a clamping around the pocket lamp (3).

In the inside (60) of the lid, opposed to the jack depression (51), e.g., an installation guide (4) for a wheel change is attached. Beside the installation guide (4), there is a depression (62) for a plug pipe wrench to free the wheel nuts, a depression (63) for the plug pipe wrench lever, a depression (64) for a smaller plug pipe wrench with swing-out lever, a clamp attachment (69) for a monkey wrench, and a depression (66) for a cross-slot screwdriver. All depressions (62-66) and the clamp attachment (69) face depressions in the receptacle wall (50).

Into the lid-side depression (62) above and below, in each instance a face clamp (72) projects. Each face clamp (72) engages a frontal hexagonal recess of the plug pipe wrench to be accommodated. The two depressions (63, 64) offset towards the backrest (16) have dampers (73) in their midregion on either side for clapless grasping of the tools to be inserted. Above the dampers (73) and the clamp attachment (69)—viz. shifted towards the upper edge of the lid—there are grip recesses (78) for readier removal of tools embedded with clamping effect. The depression (66) has two clamp teeth (76) on either side, matching the clamp teeth (77) of the pocket lamp holder.

By the arrangement of the depressions in the lid (40) and in the receptacle wall (50), and by the alternate complementation, i.e., some of the tools and emergency aids (2, 4) are accessible in the opened lid (40), while the rest are arranged in the receptacle wall (50), a greater handiness and better accessibility result.

Alternatively, it is of course possible to accommodate all tools and aids in the receptacle wall (50) only. Also, in that case, among other things, the clamp teeth (72-77) may be held by a plurality of elastic straps stretched e.g. horizontally over the receptacle wall (50). In that case, the depressions would become nearly perpendicular to the straps.

The bass reflection box (30) as so far described is fixedly installed in the rear side compartment. The bass reflection box (30) may alternatively be of removable construction. In this modified embodiment, the bass reflection box (30) is constructed as an enclosed container. The bass reflection box (30) is connected by a cable at least five meters in length to the vehicle cable tree, the cable being bridged in the case of a built-in bass reflection box (30), optionally by an electrical bridge.

Through the availability of a long cable, the bass reflection box (30) e.g. in an emergency, can be carried to the site with its tools. In this bass reflection box (30), additionally a cardanically suspended searchlight—supplied by the vehicle circuit—may be installed. The latter may serve to light the emergency site, or by blinking, possibly with color filter, secure the emergency site. Additionally, in such a bass reflection box (30), a receptacle carrying current from the vehicle circuit may be integrated as well.

At the same time, during repairs, the sound reproduction system may be in operation. Further, the bass reflection box (30) can be employed to enhance the vehicle leisure-time quality for external audio.

With the externally usable bass reflection box (30), the latter is released from the vehicle superstructure by the key (46). The funnel (48) serves as grip trough in transport. To avoid contact of the lid (40) with the commonly soiled roadway surface, the lid (40) can be secured, against too wide opening, with a tether. In another modification, provision may be made to hang the lid (40) out on the bass reflection box (30) in order to bring it to the site with the tools like a tablet. The separate lid (40) may also serve on the spot as a knee pad.

Of course, the bass reflection box (30) may alternatively be arranged in the step or rear of a vehicle. Here, the upper wall (35) of the bass reflection box (30) will extend into the neighborhood of the hat rack. That is where the bass reflection tube terminates ahead of the rear panel in the direction of travel (9). At the same time, a portion of the hat rack or of the backrest (16) must be sound-transmissive for the direct sound of the speaker (5).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for reproduction of sound in a motor vehicle having an interior and a side compartment arranged therein, said system comprising:

a sound reproduction system including at least one bass reflection box equipped with a bass reflection pipe and/or a bass reflection opening and at least one built-in speaker;

said bass reflection box being arranged in the side compartment of the interior of the motor vehicle and including a lid oriented toward the interior of the motor vehicle, said lid of the bass reflection box oriented toward the interior of the motor vehicle including a sound-transmissive portion and a rigid receptacle receiving portion; and a receptacle wall having depressions therein located behind the lid adapted to receive at least one tool between said bass reflection box and said rigid receptacle receiving portion of said lid such that said lid orients the sound-transmissive portion adjacent said bass reflection box and said rigid receptacle receiving portion away from said bass reflection box when said lid is in a closed position to secure the tool therebehind while allowing sound to pass through unobstructed.

2. The system according to claim 1, further comprising the lid having at least one swing articulation whose axis of swing is oriented parallel to a floor of the interior of the vehicle, located in front of the bass reflection box.

3. The system according to claim 2, wherein the axis of swing is located in close proximity above the floor of the interior of the vehicle.

4. The system according to claim 1, further comprising a side compartment located behind a rear wheel box of the vehicle superstructure.

5. The system according to claim 1, wherein the service tool kit to be stowed on the bass reflection box includes at least a jack, a wheel nut tube wrench, and a lever for rotating the wheel nut wrench about its longitudinal axis.

6. The system according to claim 1, wherein the several tools of the service tool kit are arranged in said depressions provided in said receptacle wall and are thereby dynamically and/or geometrically fixed in said recesses.

7. The system according to claim 1, wherein the bass reflection opening is arranged above or to one side of the lid.

8. The system according to claim 1, wherein at least one dynamic speaker is arranged behind the sound-transmissive lid.

9. The system according to claim 1, wherein the bass reflection box is removable arranged in the side compartment of the vehicle.

10. The system according to claim 9, wherein the removable bass reflection box is equipped with an extension cable at least five meters in length.

11. The system according to claim 1, wherein said at least one tool further comprises a service tool kit and emergency aids.

* * * * *